United States Patent
Tjhang et al.

(10) Patent No.: US 8,362,916 B2
(45) Date of Patent: Jan. 29, 2013

(54) METHODS AND SYSTEMS FOR BOREHOLE TELEMETRY

(75) Inventors: Theodorus Tjhang, Sagamihara (JP); Yuichi Kobayashi, Tokyo (JP); David Santoso, Sagamihara (JP); Nalin Weerasinghe, Sagamihara (JP); Motohiro Nakanouchi, Tokyo (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 479 days.

(21) Appl. No.: 12/699,783

(22) Filed: Feb. 3, 2010

(65) Prior Publication Data

US 2010/0194586 A1    Aug. 5, 2010

Related U.S. Application Data

(60) Provisional application No. 61/150,291, filed on Feb. 5, 2009.

(51) Int. Cl.
*G01V 3/00* (2006.01)

(52) U.S. Cl. ............ 340/854.7; 340/854.9; 340/854.3

(58) Field of Classification Search ........... 340/854.9, 340/854.3, 855.7
See application file for complete search history.

(56) References Cited

U.S. PATENT DOCUMENTS

| | | | |
|---|---|---|---|
| 5,838,727 A | 11/1998 | Lyon et al. | |
| 6,292,559 B1* | 9/2001 | Gaikwad et al. | 379/417 |
| 6,999,517 B1* | 2/2006 | Bombay et al. | 375/257 |
| 7,035,400 B1* | 4/2006 | Gaikwad et al. | 379/417 |
| 2002/0101359 A1* | 8/2002 | Huckaba et al. | 340/854.9 |
| 2003/0010492 A1 | 1/2003 | Hill et al. | |
| 2003/0161412 A1* | 8/2003 | Niida et al. | 375/299 |
| 2003/0165189 A1* | 9/2003 | Kadous | 375/225 |
| 2003/0210750 A1* | 11/2003 | Onggosanusi et al. | 375/295 |
| 2004/0155794 A1* | 8/2004 | Gardner | 340/855.7 |
| 2004/0222901 A1* | 11/2004 | Dodge et al. | 340/854.3 |
| 2005/0270171 A1 | 12/2005 | Quintero et al. | |
| 2006/0176993 A1* | 8/2006 | Kwun et al. | 375/367 |
| 2007/0035812 A1* | 2/2007 | Roller | 359/337.1 |
| 2007/0081582 A1* | 4/2007 | Ginis et al. | 375/222 |
| 2009/0167556 A1* | 7/2009 | Signer et al. | 340/853.1 |

FOREIGN PATENT DOCUMENTS

| | | | |
|---|---|---|---|
| GB | 2408432 A | 5/2005 | |
| WO | 02/077413 A1 | 10/2002 | |

\* cited by examiner

*Primary Examiner* — Jean B Jeanglaude
(74) *Attorney, Agent, or Firm* — Jianguang Du; Jody DeStefanis

(57) ABSTRACT

Methods and systems for borehole telemetry utilizing a tool configured or designed for deployment in a borehole traversing a subterranean formation. The tool includes a downhole telemetry module; a surface telemetry module; and a datalink between the downhole and surface modules configured or designed for transferring data over one or more data communication channels utilizing at least one telemetry scheme selected from a plurality of telemetry schemes based on at least one downhole parameter.

26 Claims, 7 Drawing Sheets

METHODS AND SYSTEMS FOR BOREHOLE TELEMETRY

CROSS REFERENCE TO RELATED APPLICATIONS

This application is a non-provisional patent application of co-pending U.S. Provisional Patent Application No. 61/150,291, filed on Feb. 5, 2009, the contents of which are incorporated herein by reference for all purposes.

BACKGROUND

The present disclosure relates generally to methods and systems for borehole telemetry in surveys relating to subterranean formations. More specifically, some aspects disclosed herein are directed to methods and systems for transmitting data between a downhole tool and a surface system utilizing a multi-scheme telemetry system for selectively sending information to improve the reliability of data transfer, in particular, in difficult environments such as borehole logging.

Accurate and rapid collection and distribution of geophysical property data is a key to successful exploration and production of petroleum resources. Based on data such as electrical and nuclear properties collected in a wellbore, as well as the propagation of sound through a formation, geophysicists make an analysis useful in making many important operational decisions. The analysis includes determination of whether a well is likely to produce hydrocarbons, whether to drill additional wells in the vicinity of an existing well, and whether to abandon a well as being unproductive.

Measurements of the type described herein are also useful in the fields of $CO_2$ sequestration, development of methane hydrate deposits, water reservoir and geothermal monitoring, earthquake monitoring, and monitoring for reservoir delineation, among other applications that are known to persons skilled in the art.

Geophysicists may also use wellbore data to select where to set casing in a well and to decide on how to perforate a well to stimulate hydrocarbon flow. One method of collecting wellbore geophysical properties is by way of well logging. In well logging, a logging tool (also often referred to as a sonde) is lowered into a wellbore on an electrical cable, the wireline. The logging tool is an electrically powered measurement device that may, for example, collect electrical data, sonic waveforms that are propagated through the surrounding formation, or radioactivity counts. These measurements are usually converted to a digital form and transmitted on the wireline. Systems for transmitting data from the borehole logging tool to a data acquisition system over a wireline cable are known as wireline telemetry systems.

Typical borehole telemetry systems operate under extreme conditions, such as high temperature, low signal to noise ratio (SNR) at the surface and/or downhole receivers due to high distortion caused by long cable length, among other extreme conditions that are known to exist in boreholes of the type described herein. In wireline borehole telemetry systems, a downhole telemetry cartridge collects data that are sent from one or more measurement tools connected to it and transmits the downhole data to a surface acquisition system through a logging cable. Depending on the tool string combination and the borehole conditions, several types of noise can be generated, which tend to negatively affect the conveyance of data and the performance of the downhole telemetry system.

Commonly owned U.S. Pat. No. 5,838,727 of Schlumberger Technology Corporation discloses one wireline telemetry system. This wireline telemetry system transmits data from the logging tool to the surface computer using a single carrier frequency. Wireline cables are primarily designed for mechanical properties. A modern oil well may be drilled to a depth of in excess of 30,000 feet. The cable must be able to sustain the tension generated from the weight of the logging tools and the weight of the lengthy cable itself.

As discussed above, logging and monitoring boreholes has been done for many years to enhance and observe recovery of oil and gas deposits. In the logging of boreholes, one method of making measurements underground includes attaching one or more tools to a wireline connected to a surface system. The tools are then lowered into a borehole by the wireline and drawn back to the surface ("logged") through the borehole while taking measurements. The wireline is usually an electrical conducting cable with limited data transmission capability. Similarly, permanent monitoring systems are established with permanent sensors that are also generally attached to an electrical cable.

Demand for higher data rates for wireline logging tools and permanent monitoring systems is growing rapidly because of higher resolution sensors, faster logging speeds, and additional tools available for a single wireline string. As a consequence of a need for higher data rates problems in data transmission arise such as degradation of data quality. Therefore, it would be desirable to transfer data between downhole and surface tools with improved signal to noise ratio (SNR) so that the quality of the transferred data is not compromised.

From the foregoing it will be apparent that there is need for improving data transmission in downhole telemetry systems, and to have a telemetry system that is more adaptable to specific borehole conditions and downhole parameters for the transfer of downhole data.

SUMMARY OF THE DISCLOSURE

The disclosure herein may meet at least some of the above-described needs and others. In consequence of the background discussed above, and other factors that are known in the field of borehole telemetry, the applicants recognized the need for methods and systems for transmitting data between downhole tools and surface systems in a reliable, efficient manner. In this, the applicants recognized that techniques were needed that could eliminate, or at least reduce, shortcomings that are inherent in the conventional methods and systems for borehole telemetry, in particular, borehole telemetry systems that utilize modems based on a single, fixed telemetry scheme.

Applicants recognized that multi-scheme telemetry techniques may be utilized in borehole telemetry systems to address problems such as low signal to noise ratio (SNR) that arise when data are transmitted over a wireline type cable. "Downhole tools" and "borehole systems" are used broadly to mean any tool or system used in a subterranean environment including, but not limited to, a logging tool, an imaging tool, an acoustic tool, a permanent monitoring tool, and a combination tool. Aspects disclosed herein include borehole communication systems combined with a plurality of devices attached along a coiled tubing, or a cable line, wire line, slickline, wired drillpipe, or any other suitable downhole deployment means having telemetry capability. For purposes of this disclosure, when any one of the terms wireline, drillpipe, cable line, slickline or coiled tubing or conveyance is used it is understood that any of the above-referenced deployment means, or any other suitable equivalent means, may be used with the present disclosure without departing from the spirit and scope of the present invention.

In some aspects, the present disclosure teaches the use of a multi-scheme telemetry system to derive improved, efficient transmission of data in borehole environments utilizing, for example, wireline cables. The applicants recognized that multi-scheme modem technology could be advantageously adapted and utilized for data telemetry applications in borehole environments, utilizing, for example, existing data telemetry cable systems, to provide data transmission results that are not possible with presently available techniques and systems.

Methods and systems disclosed herein are directed at borehole telemetry systems comprising a tool configured or designed for deployment in a borehole traversing a subterranean formation. In some embodiments of the present disclosure, the tool comprises a downhole telemetry module; a surface telemetry module; a datalink between the downhole and surface modules configured or designed for transferring data over one or more data communication channels; and a multi-scheme modem configured or designed for transferring data between the downhole and surface modules utilizing a telemetry scheme selected from a predetermined plurality of telemetry schemes based on at least one downhole parameter.

In aspects herein, the datalink transfers data between the surface and downhole modules via a wireline cable. In yet other embodiments, the wireline cable may comprise a 7 cable heptacable. The wireline cable may provide power to downhole tools. The downhole telemetry module may be connected to at least one tool configured for making measurements while in the borehole, and the datalink may be configured or designed to pass data to and from the tool.

A method for borehole telemetry is provided comprising deploying a tool at least one depth in a borehole traversing a subterranean formation. The tool comprises a downhole telemetry module and data is transferred over a datalink between the downhole telemetry module and a surface telemetry module. The datalink may comprise one or more data communication channels. The data is transferred by selecting a telemetry scheme from a predetermined plurality of telemetry schemes based on at least one downhole parameter.

In some embodiments, at least one of the downhole telemetry module and the surface telemetry module comprises a multi-scheme modem configured or designed for selecting the at least one telemetry scheme. In other embodiments, the multi-scheme modem may be configured or designed for automatic and/or manual selection of the at least one telemetry scheme. In aspects of the present disclosure, the multi-scheme modem may be configured or designed for selecting one of two telemetry schemes based on channel conditions and/or data rate.

In certain embodiments of the present disclosure, the at least one telemetry scheme may be selected from a plurality of modulation/demodulation schemes based on at least one downhole parameter.

In yet another embodiment of the present disclosure, a tool configured for deployment at least one depth in a borehole traversing a subterranean formation comprises a plurality of shuttles. The shuttles comprise a plurality of downhole tools and at least one downhole telemetry cartridge, each downhole tool being configured or designed for data communication with the at least one downhole telemetry cartridge through an associated interface package, via a downhole telemetry controller. The downhole telemetry controller is operatively connected to a surface system by at least a first and a second telemetry scheme, and the telemetry controller is configured or designed to select between the at least first and second telemetry scheme for data transfer with the surface system.

Aspects of the present disclosure provide a method for borehole telemetry. The method comprises deploying a tool at least one depth in a borehole traversing a subterranean formation, the tool comprising a downhole telemetry module; obtaining subterranean formation information with a downhole measurement tool; sending the information to a downhole telemetry controller; selecting one of a plurality of telemetry schemes based on at least one downhole parameter; and transferring data over a datalink between the downhole telemetry controller and a surface telemetry module utilizing the selected telemetry scheme.

In certain aspects of the present disclosure, the plurality of telemetry schemes include different modulation and demodulation schemes. In other aspects, the selecting may be done automatically without user intervention. In yet other aspects herein, the plurality of telemetry schemes include different operational bandwidths. In further aspects, the plurality of telemetry schemes include copper, wireless or optical telemetry. In yet further aspects of the present disclosure, the plurality of telemetry schemes include using different conductors pairs in a heptacable. In some embodiments herein, the plurality of telemetry schemes include different tool synchronization schemes. In further embodiments disclosed herein, the plurality of telemetry schemes include different modes of transmitting AC or DC power and/or electrical signals. In yet further embodiments, the plurality of telemetry schemes include different operational connections based on compatibility with other downhole measurement tools. In still further embodiments disclosed herein, the plurality of telemetry schemes include different operational connections based on tool bus type and connection between each downhole measurement tool.

In some embodiments, the present disclosure provides a method for improving signal to noise ratio (SNR) in borehole telemetry. The method comprising transferring data over at least one datalink between a downhole telemetry module and a surface telemetry module, the datalink comprising a plurality of data telemetry schemes; selecting one of the plurality of telemetry schemes based on at least one downhole parameter; and transferring data over the datalink utilizing the selected telemetry scheme, wherein the selected telemetry scheme reduces noise in the transferred data to increase the signal to noise ratio (SNR) of received data.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of the present invention.

Figure 1:
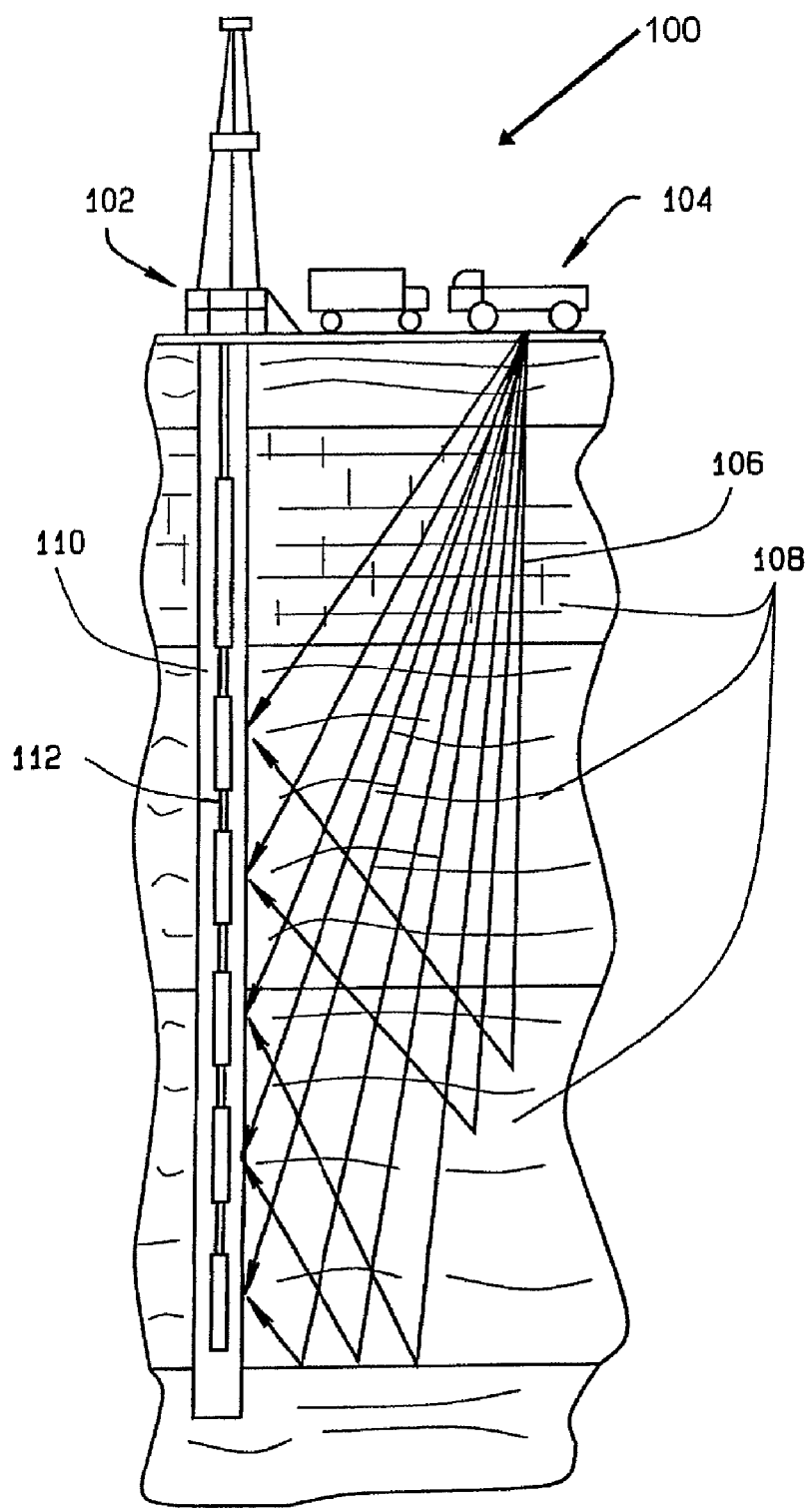
FIG. 1 is a schematic representation of a typical well site with a borehole traversing subsurface formations.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

In the logging of boreholes, one method of making measurements underground comprises connecting one or more tools to a cable connected to a surface system. In this, the present disclosure contemplates applications such as wireline, logging-while-drilling, measurement-while-drilling, permanent and/or semi-permanent monitoring, production logging, $CO_2$ and water reservoir monitoring, earthquake monitoring, among others that are known to those skilled in the art in which data telemetry is required. The tools are then lowered into the borehole and then drawn back to the surface ("logged") through the borehole while making measurements. The cable often has multiple conductors, for example, a 7 conductor cable known in the art as a heptacable is common. The conductors of the cable provide power to the tool from the surface and provide a route for electric signals to be passed between the tool and the surface system. These signals are for example, tool control signals which pass from the surface system to the tool, and tool operation signals and data which pass from the tool to the surface system.

As used throughout the specification and claims, the term "downhole" refers to a subterranean environment, particularly in a wellbore, such as in the field of oilfield exploration and development, management of oil and water reservoirs, sequestration of substances such as $CO_2$, and geothermal applications. The term "telemetry scheme" refers to any technique or method that is utilized for data transmission between a downhole tool and the surface. In this, a telemetry scheme includes all instrumentation and software that are utilized in linking the downhole components with the surface, for example, hardware, software, and/or hybrid hardware-software devices may be combined as desirable or necessary to provide the desired data link.

Referring to FIG. 1, a schematic depiction of a well site is shown with a diagrammatic representation of a cross section of the subsurface formations traversed by a borehole. The subterranean system 100 includes well instrumentation 102 at the surface including all associated instrumentation and monitoring systems. Also shown at the surface is a surface source 104 which is depicted as a vibration vehicle. The plurality of lines 106 are intended to represent excitations or seismic vibrations traveling through the subsurface formations producing seismic data that can be sensed by downhole sensor arrays. The present systems and methods can be utilized to record seismic data for conducting a seismic survey of the subsurface formations 108. Aspects herein can also be utilized to control and monitor operations during production by monitoring seismic data from the various subsurface formations, regions, and zones. In the monitoring capacity, the disclosure herein can be utilized to optimize production of the well. The placement of the well bore 110 can be strategically located based on known seismic survey data that may have been previously obtained. Optimal placement of the well bore is desired such that optimal recording of seismic data for the subsurface formations of interest can be obtained.

Once the well bore has been established, a wireline (cable line) 112, a coiled tubing or other conveyance can be spooled to extend down through the wellbore where the plurality of sensor arrays are positioned along the wireline 112. Also, note that the wireline with the seismic sensors attached thereto can be extended as the wellbore is being established. The principles described herein can be either permanently deployed for continuous production well monitoring or can be temporarily deployed for performing a subsurface seismic survey and then retracted. Permanent deployments enable continuous monitoring of production well operations. Once the wireline and the plurality of sensor arrays are in position, seismic data can begin to be gathered. If production ceases at the well or for some other reason seismic monitoring is no longer required, the system can be retracted and reutilized elsewhere. Note that the exemplary systems presented herein to describe embodiments are for the purpose of illustration and ease of understanding the apparatus and methods. The illustrations shown and described herein should not be construed to be limiting in any way with respect to the scope of the claims.

Figure 2:
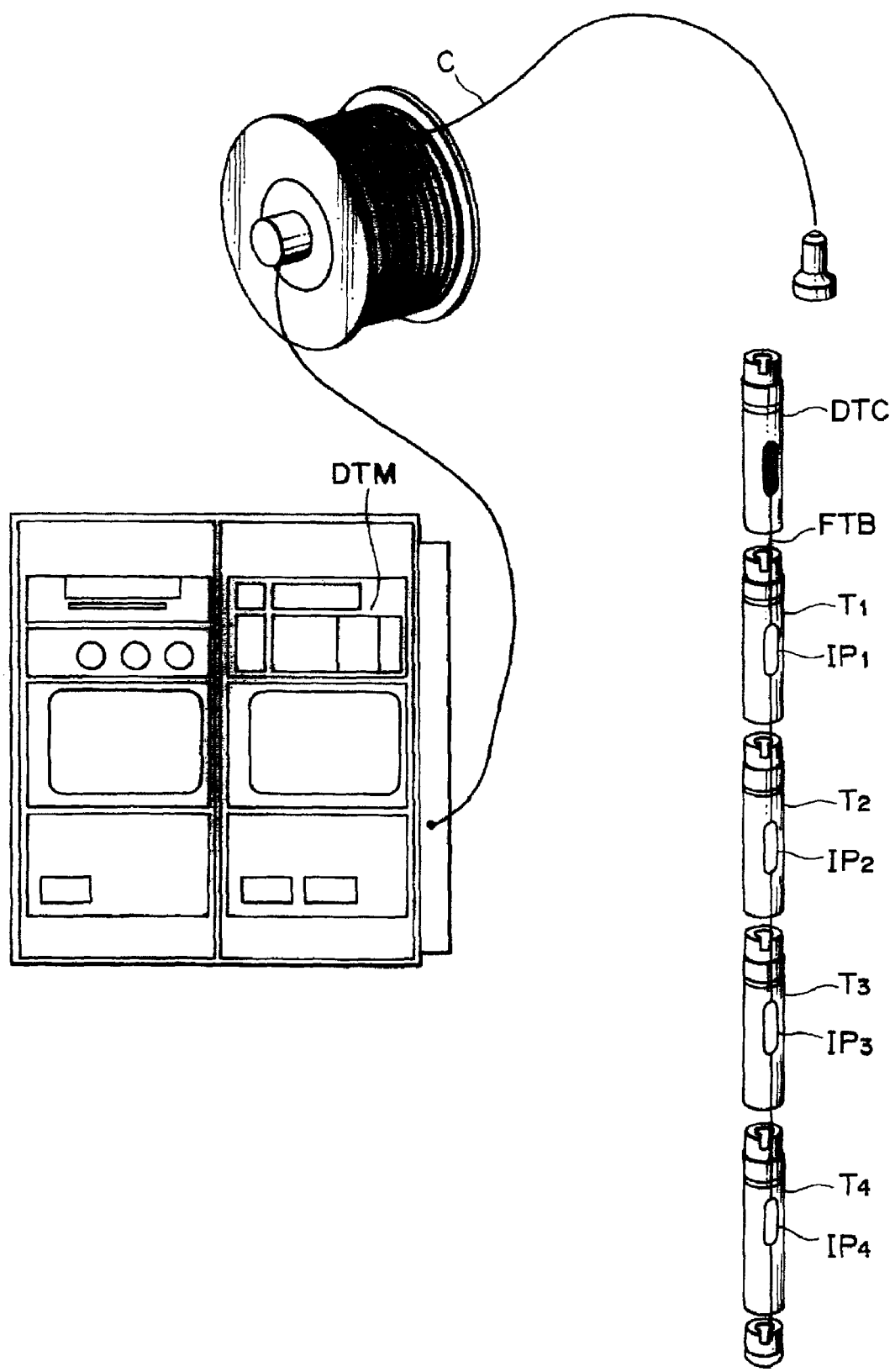
FIG. 2 illustrates schematically one exemplary borehole telemetry system of the present disclosure for monitoring subterranean formations according to the principles described herein.

A schematic view of one possible borehole telemetry system is shown in FIG. 2. The system shown comprises a surface acquisition module or surface modem (DTM) which is typically located at the surface, a cable C, a downhole modem (DTC) at the head of a tool string which includes a number of downhole tools T1, T2, . . . each containing a respective interface package IP1, IP2, . . . through which they are in communication with the DTC via a toolbus. This system is configured to handle data flows in opposite directions, i.e. from the tools, via the respective IPs and FTB, to the DTC and then to the DTM over the cable ("uplink"), and the reverse direction from the DTM to the DTC and tools over the same path ("downlink"). A principal object of the system is to provide a communication path from the tools to the surface so that data acquired by the tools in use can be processed and analyzed at the surface.

Because of the electrical limitations on a wireline cable, for example, the signal to noise ratio (SNR) can adversely impact the data rate. It would be desirable to provide systems and methods which overcome the signal to noise ratio (SNR) and other noise problems associated with borehole telemetry systems.

Figure 3:
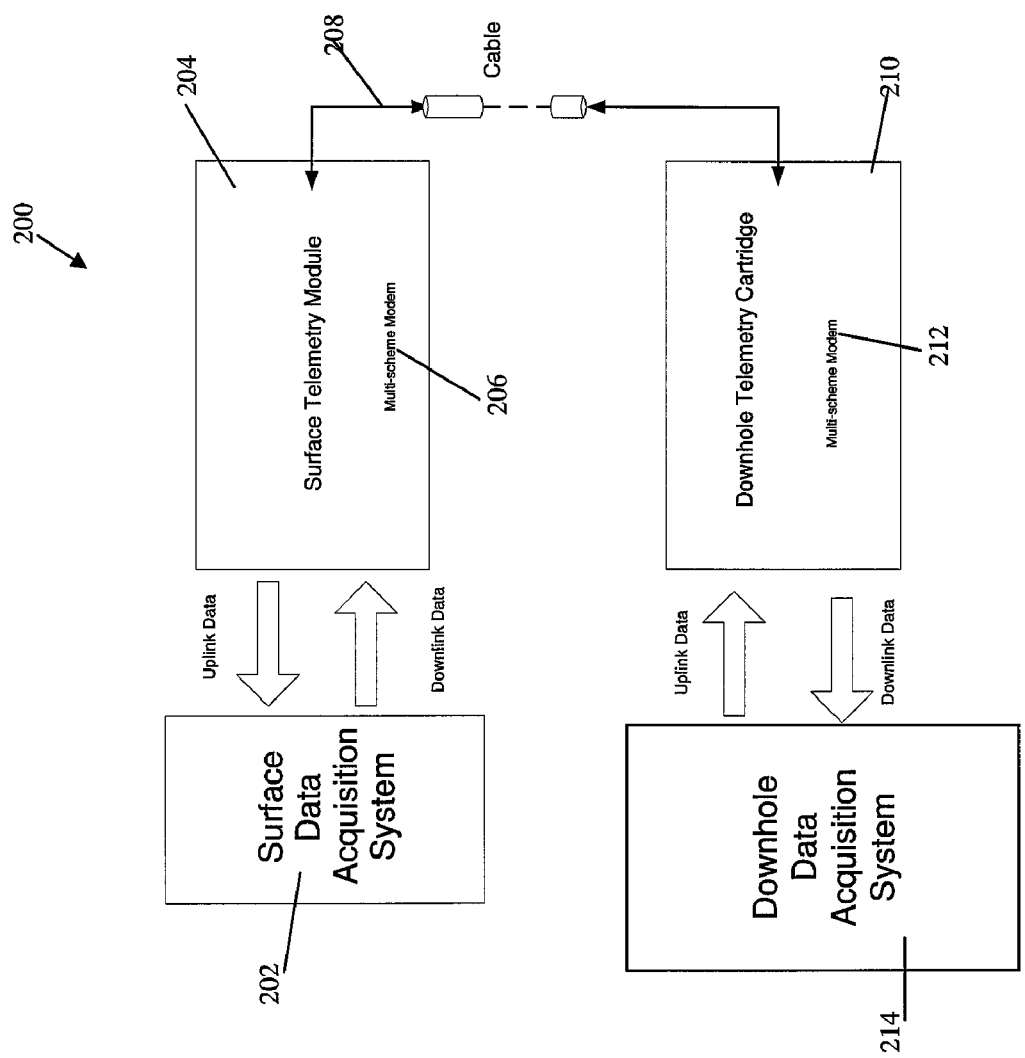
FIG. 3 is a schematic depiction of one borehole system with a downhole telemetry cartridge according to one embodiment of the present disclosure.

FIG. 3 is a schematic depiction of a downhole system 200 according to principles of the present disclosure. The system 200 includes a surface data acquisition unit 202 in electrical communication with or as a part of a surface telemetry unit 204. The surface telemetry unit 204 may or may not be an optical telemetry module. The surface telemetry unit 204 includes a multi-scheme modem 206.

The surface telemetry unit 204 is operatively connected to a cable 208, for example, a copper cable or a single optic fiber. The cable interface 208 provides a communication link between the surface telemetry unit 204 and a downhole telemetry cartridge 210. The downhole telemetry cartridge 210 is part of the system 200 and includes a downhole multi-scheme modem 212.

The downhole telemetry cartridge 210 may be operatively connected to a downhole electrical tool bus (not shown). The downhole electrical tool bus provides electrical communication link between the downhole telemetry cartridge 210 and one or more downhole tools (depicted generally as downhole data acquisition system 214). The downhole tools may each have one or more sensors for measuring certain parameters in a wellbore, and a transceiver for sending and receiving data.

The downhole telemetry system of FIG. 3 may be a hybrid optical-electrical apparatus that may use standard electrical telemetry and sensor technology downhole with the advantage of a high bandwidth fiber optic interface between the downhole components (optical telemetry cartridge, downhole tools) and the surface data acquisition unit.

Communications and data transfer between the surface data acquisition unit and one of the downhole tools (depicted as downhole data acquisition system 214) is now described. An electronic Down Command from the data acquisition unit 202 is sent electrically to the surface telemetry unit 204. A downlink modulator of the surface telemetry unit 204 modulates the electronic Down Command, which is transmitted via the interface 208 to the downhole telemetry cartridge 210. A downlink demodulator demodulates the signal, and the downhole telemetry cartridge 210 transmits the demodulated electronic signal along the downhole electrical tool bus (not shown) where it is received by the downhole tool(s).

Similarly, Uplink Data from the downhole tool(s) is transmitted uphole via the downhole electrical tool bus (not shown) to the downhole telemetry cartridge 210, where it is modulated by an uplink modulator and is transmitted uphole via the interface 208 to the surface telemetry unit 204. Sensors of the downhole tools may provide analog signals. Therefore, according to some aspects of the present disclosure, an analog-to-digital converter may be included with each downhole tool or anywhere between the downhole tools and the uplink and downlink modulators/demodulators, as desirable or necessary. Consequently, analog signals from sensors are converted into digital signals, and the digital signals are modulated by the uplink modulator to the surface.

Figure 4:
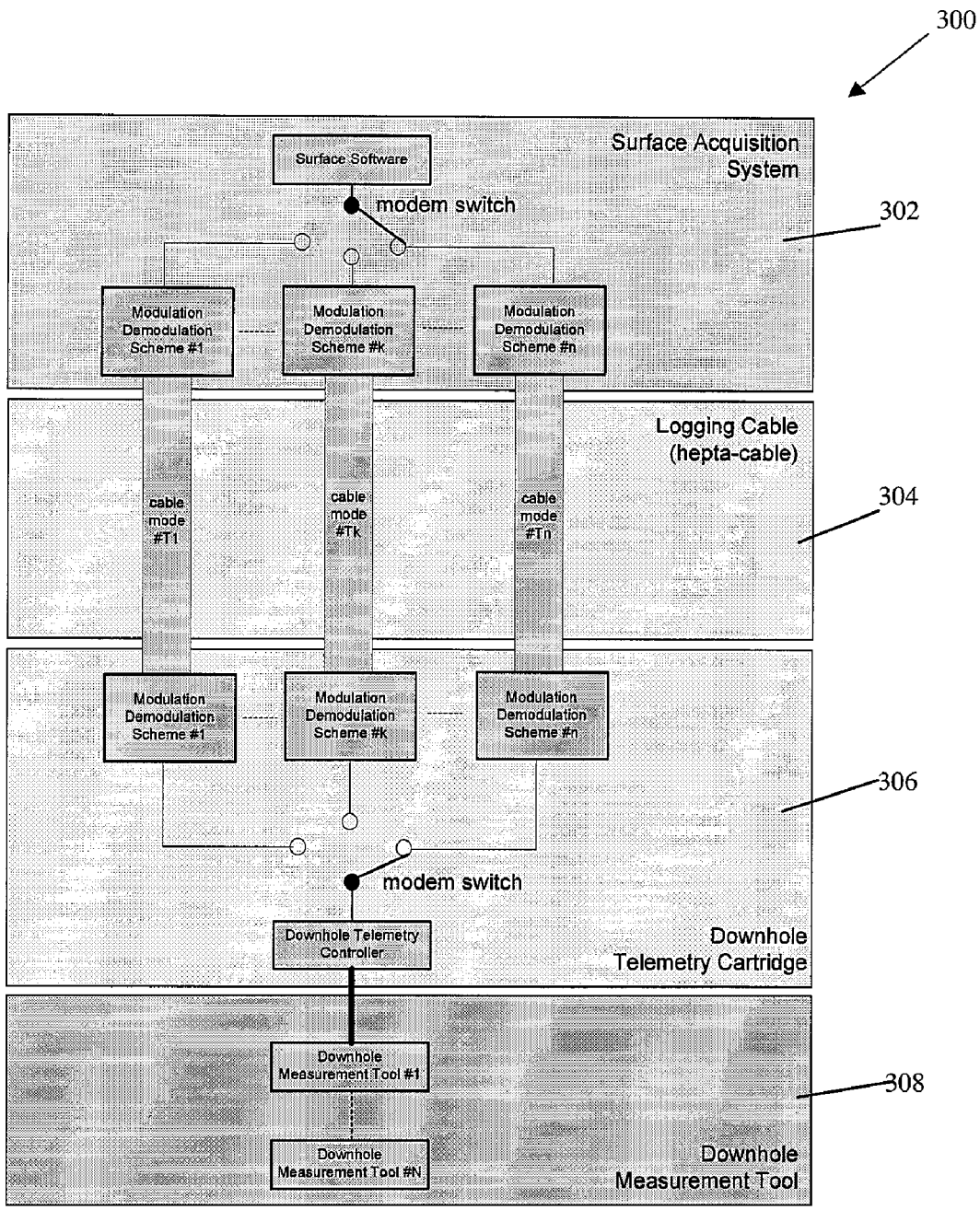
FIG. 4 is one exemplary schematic depiction of one configuration for downlink and uplink borehole telemetry utilizing a borehole adaptive telemetry system with a multi-mode modem according to the present disclosure.

FIG. 4 shows schematically one exemplary telemetry system 300 in accordance with the present disclosure. The basic functional parts of the system comprise a surface telemetry module or modem 302, a cable 304 and a downhole telemetry cartridge or modem 306. In one possible embodiment, the surface telemetry modem 302 is configured or designed for one or more data communication channels with a first channel having a modulation/demodulation scheme #1 connected to a cable mode #T1, and a second channel having a modulation/demodulation scheme #2 connected to a cable mode #T2 of the logging cable 304. The downhole telemetry cartridge or modem 306 is likewise configured. In FIG. 4, the system may be configured for downlink and uplink data transfer. Although three channels are depicted in FIG. 4, it is contemplated that additional channels also may be used for the purposes described herein.

In use, signals pass from the surface telemetry module 302 through the data communication channels, to the downhole telemetry cartridge 306 from which they are passed to the various tools in the tool string 308.

As illustrated in FIG. 4, the telemetry system 300 may include one or more downhole measurement tools from which various types of information may be obtained related to subterranean formations, the borehole, the tool itself, mud properties, among other data that typically are acquired during downhole sensing operations of the type described herein. The acquired data may then be transmitted to the downhole telemetry cartridge 306 that may prioritize the information and may apply optimal modulation to deliver the information to the surface acquisition system 302 through a long conveyance, such as the logging cable 304, with minimum error rate. Additionally, an error check and a retransmission scheme may be used to assure loss free data transmission. The same mechanism and techniques may also be applied for data transmission from the surface to downhole, i.e., downlink data.

In one exemplary embodiment, according to the principles described herein the surface acquisition system 302 and/or the downhole telemetry cartridge 306 may also choose which telemetry scheme is best suited for transmitting the information between the surface system and the downhole system. In this, the present disclosure contemplates that the telemetry scheme may be selected based on several factors including, but not limited to:

Noise due to borehole conditions such as borehole temperature and pressure; mud characteristics; shock and vibration during the logging operation; configuration of the conveyance conductor, i.e., the cable mode; noise generated by other downhole measurement tool(s) or by the surface system or by other active electrical devices; electro-magnetic noise; and other electrical noise sources that affect the telemetry system.

Noise properties such as frequency characteristics; duration, for example, the noise might vary along with time; amplitude/power; among other properties of noise that adversely affect data transmission by the telemetry system.

Performance of electronic devices/components that deteriorates due to the aging of downhole cartridge and conveyance system, due to the destructive contamination by gas or liquid or debris, due to shock and borehole pressure and borehole temperature, and other factors that cause deterioration in the performance of downhole and surface components.

The present disclosure further contemplates that a telemetry scheme may be selected from a predetermined number of telemetry schemes by automatic selection based on predetermined criteria or may be selected by user input. For example, it is envisioned that a hybrid software/hardware modem may be provided that automatically selects between predetermined telemetry schemes based on certain borehole and/or system parameter conditions being met. Alternatively, a user may set the appropriate telemetry scheme based on information derived from the telemetry system during an initial training sequence.

In one possible embodiment according to the present disclosure, after a downhole tool system is deployed, during the power up/training sequence, SNR quality of the telemetry system may be checked to determine downhole data communication parameters based on the transmission of a known signal. In this, the performance of the telemetry cartridges or modems may be evaluated based on borehole conditions, and appropriate selection may be made, automatically or manually, based on the results of the evaluation so that data transmission is achieved consistent with the requirements of the job. As previously discussed, the present disclosure contemplates the design or configuration of multi-scheme modems that are capable of adapting to downhole parameters and/or tool/cable conditions, such as temperature, maintenance, aging, for example, by selecting an appropriate telemetry scheme for the job conditions from among a plurality of telemetry schemes.

Figure 5:
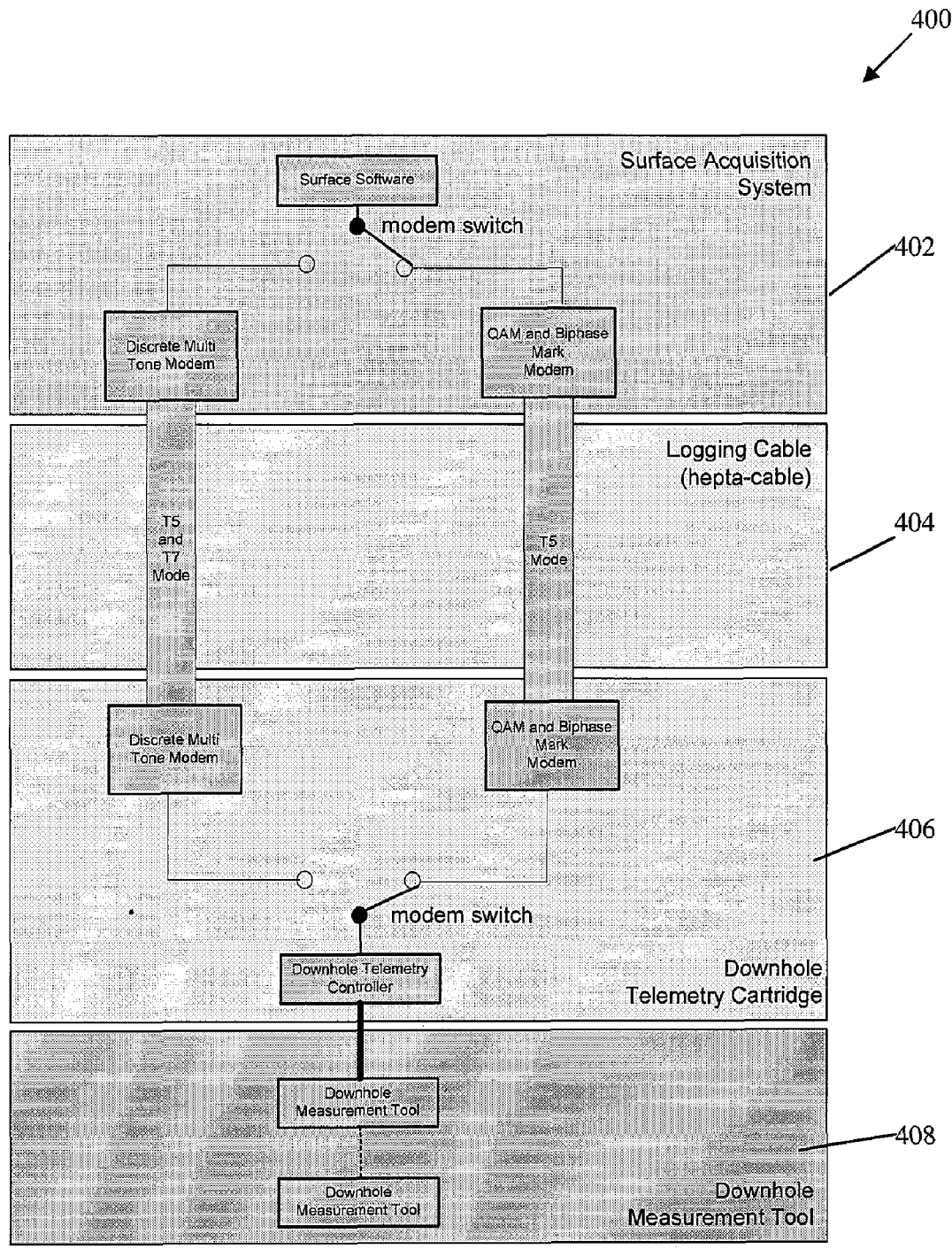
FIG. 5 is another exemplary schematic depiction of one configuration for a datalink utilizing a two telemetry scheme system in borehole telemetry according to the present disclosure.

As one possible borehole telemetry system based on the principles disclosed herein, two telemetry schemes may be utilized such as Schlumberger's Enhanced Digital Telemetry System (EDTS) scheme and Schlumberger's Digital Telemetry System (DTS) on Enhanced Digital Telemetry Cartridge (EDTC) scheme, as shown in FIG. 5. The system may include the following system switch sequence:

1. Toolstring power-up. For example, the default mode telemetry scheme may use T5 for uplink and T7 cable modes.
2. Surface system acquires cable and downhole receiver status and condition by measuring a training or known test signal.
3. An appropriate telemetry scheme is selected based on the following:
    If the default scheme can not establish a reliable telemetry link as determined by, for example, a measured signal to noise ratio, the system recommends selection of the other scheme, or a change in system parameters, for example, a reduction or increase in telemetry bandwidth, an increase or decrease in gain, a decrease in data rate, etc.
    If a particular cable mode, for example, T7, is needed for other purposes, or it can not be used due to a failure, so that it is not possible to utilize the default scheme, the telemetry scheme may be switched to the one that operates solely on the other cable mode, for example, T5. This decision may be taken at Step 1 above.
4. Run system with selected telemetry scheme.
5. If the predetermined parameters in Step 3 are encountered during operation, the above process may be repeated.

With the principles discussed herein, an adaptive borehole telemetry system may be designed or configured that has the ability to select the most suitable telemetry scheme so as to adapt with different types of noise sources, borehole conditions, etc., as previously discussed above. It is contemplated that the telemetry schemes according to the present disclosure may be many and may vary greatly. For example, the telemetry schemes may vary in the type of modulation and demodulation scheme, the type of surface acquisition system and/or the type of downhole telemetry cartridge that is used.

On the other hand, the telemetry schemes may vary by the physical medium a logging cable comprises, such as copper, wireless or optical telemetry, for example. Other telemetry schemes may include using full or partial bandwidth, as available with cable, adaptively depending on certain conditions such as SNR property or cable performance.

Figure 6:
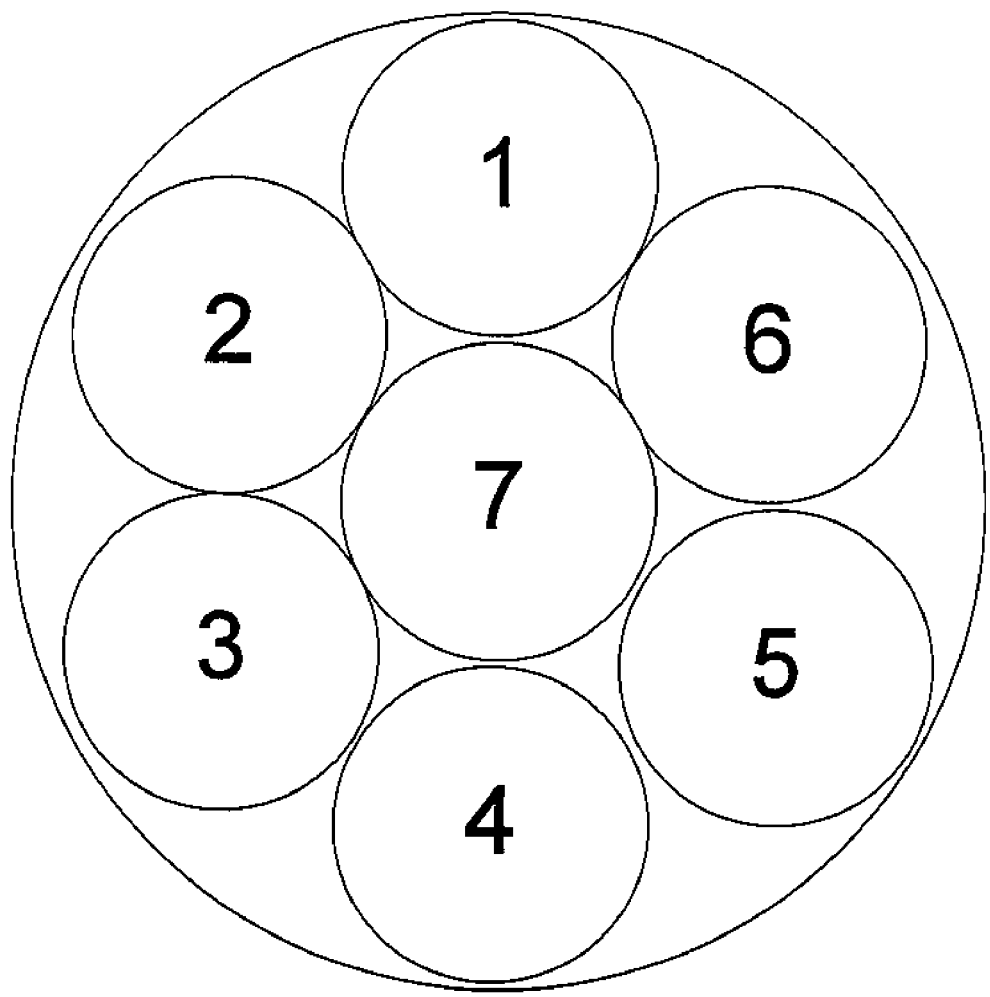
FIG. 6 is a schematic depiction of a cross-sectional view of a heptacable for data communication according to the principles described herein.

Further, telemetry schemes according to the present disclosure may include cable mode selection by using different conductors pairs in, for example, a heptacable. For example, as depicted in FIG. 6, conductor pairs 2,3,5,6, i.e., the so called T5 mode, may be selected, or conductor 7 and armor, i.e., the so called T7 mode, may be selected based on downhole parameters.

Further telemetry schemes, or variations on schemes, contemplated by the present disclosure include, but are not limited to:

Telemetry schemes based on clock synchronization considerations, for example, between a surface system and downhole tool(s), including a Global Positioning System (GPS); between each downhole measurement tool; between downhole tools in a plurality of distance-separated boreholes; among other factors relating to downhole data communication.

Telemetry schemes required for different ways of sending AC or DC power and electrical signals uphole or downhole.

Telemetry schemes relating to connection compatibility with other downhole measurement tools.

Telemetry schemes relating to tool bus type and type of connection between each downhole measurement tool.

In a further exemplary embodiment depicted in FIG. 5, two telemetry schemes may be provided for transmitting and receiving data on a suitable conveyance 404 by sub-dividing the downlink communication, i.e., surface to downhole link, and the uplink communication, i.e., downhole to surface link, into:

Scheme #1: Frequency Division Duplex (FDD) using Discrete Multi Tone (DMT) Modem on more than a single cable mode; and Scheme #2: Time Division Duplex (TDD) using QAM (Quadrature Amplitude Modulation) for uplink transmission and Biphase Mark Modem for downlink transmission on a single cable mode.

In the exemplary embodiment of FIG. 5, Scheme #1 may use Discrete Multi Tone (DMT) modulation and demodulation for both of its uplink and downlink. In Scheme #1, any cable mode may be used for uplink and downlink data transmission by dedicating individual frequency bands to each way of transmission. On the other hand, Scheme #2 may use QAM modulation and demodulation for its uplink and Biphase Mark modulation and demodulation for its downlink. It is noted that the modulation/demodulation methods, i.e., QAM or Biphase, are given merely as examples, but can vary depending on other communication methods. In Scheme #2, a robust cable mode may be used for data transmission where uplink and downlink transmission is switched in a time division manner. It is contemplated that Scheme #1 will provide a higher data rate. However, the downlink signal of Scheme #1 may be susceptible to noise depending on the particular cable mode that is used and the particular tool string that is connected below the cable. In this case, the telemetry system 400 according to the present embodiment may be configured or designed with a multi-scheme modem or controller that can automatically select, or alternatively a user may manually switch the telemetry system to use, Scheme #2, which is more robust and may be better able to overcome the bad channel conditions.

Figure 7:
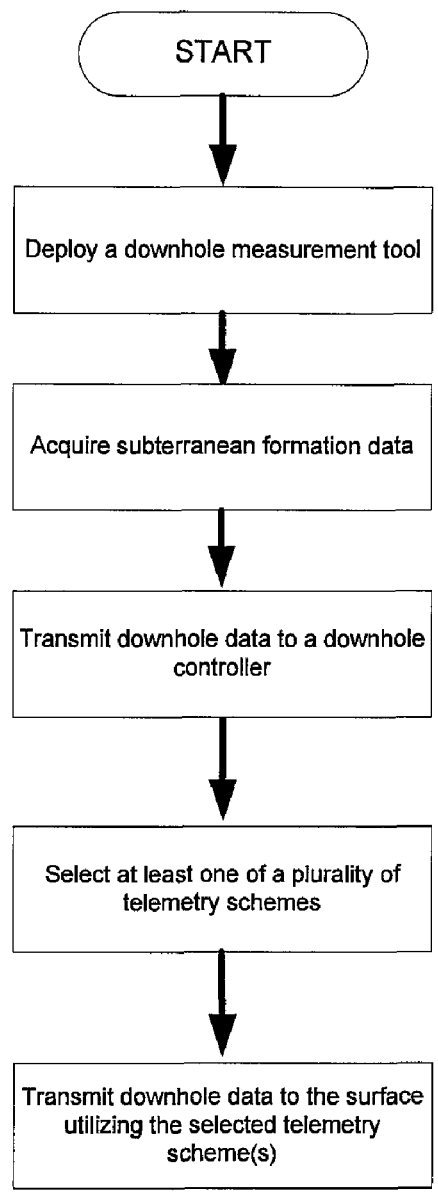
FIG. 7 is a flowchart of one possible method for data communication according to the present disclosure.

FIG. 7 is a flowchart depicting one possible data telemetry technique utilizing a multi-scheme telemetry system according to the present disclosure.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A borehole telemetry system, comprising:
a tool configured for deployment in a borehole traversing a subterranean formation, the tool comprising a downhole telemetry module, a surface telemetry module, and a datalink between the downhole and surface modules configured for transferring data over one or more data communication channels, wherein
the system is configured such that the data is transferred utilizing at least one telemetry scheme selected from a plurality of telemetry schemes based on at least one downhole parameter.

2. The telemetry system of claim 1, wherein at least one of the downhole telemetry module and the surface telemetry module comprises a multi-scheme modem configured for selecting the at least one telemetry scheme.

3. The telemetry system of claim 2, wherein the multi-scheme modem is configured for automatic selection of the at least one telemetry scheme.

4. The telemetry system of claim 2, wherein the multi-scheme modem is configured for manual selection of the at least one telemetry scheme.

5. The telemetry system of claim 2, wherein the multi-scheme modem is configured for selecting one of two telemetry schemes based on channel conditions.

6. The telemetry system of claim 2, wherein the multi-scheme modem is configured for selecting one of two telemetry schemes based on data rate.

7. The telemetry system of claim 1, wherein the at least one telemetry scheme is selected from a plurality of modulation/demodulation schemes based on at least one downhole parameter.

8. The telemetry system of claim 1, wherein the datalink transfers data between the surface and downhole modules via a wireline cable.

9. The telemetry system of claim 8, wherein the wireline cable comprises a 7 cable heptacable.

10. The telemetry system of claim 8, wherein the wireline cable also provides power to downhole tools.

11. The telemetry system of claim 1, wherein the downhole telemetry module is connected to at least one tool configured for making measurements while in the borehole, the datalink being configured to pass data to and from the tool.

12. A tool configured for deployment at at least one depth in a borehole traversing a subterranean formation, comprising:
a plurality of shuttles, comprising:
a plurality of downhole tools and at least one downhole telemetry cartridge, each downhole tool being configured for data communication with the at least one downhole telemetry cartridge through an associated interface package, via a downhole telemetry controller, wherein
the downhole telemetry controller is operatively connected to a surface system by at least a first and a second telemetry scheme, and
the telemetry controller is configured to select between the at least first and second telemetry scheme for data transfer with the surface system based on at least one downhole parameter.

13. A method for borehole telemetry, comprising:
deploying a tool at at least one depth in a borehole traversing a subterranean formation, the tool comprising a downhole telemetry module;
obtaining subterranean formation information with a downhole measurement tool;
sending the information to a downhole telemetry controller;
selecting one of a plurality of telemetry schemes based on at least one downhole parameter; and
transferring data over a datalink between the downhole telemetry controller and a surface telemetry module utilizing the selected telemetry scheme.

14. The method of claim 13, wherein the plurality of telemetry schemes include different modulation and demodulation schemes.

15. The method of claim 13, wherein the selecting is done automatically without user intervention.

16. The method of claim 13, wherein the plurality of telemetry schemes include different operational bandwidths.

17. The method of claim 13, wherein the plurality of telemetry schemes include copper, wireless or optical telemetry.

18. The method of claim 13, wherein the plurality of telemetry schemes include using different conductors pairs in a heptacable.

19. The method of claim 13, wherein the plurality of telemetry schemes include different tool synchronization schemes.

20. The method of claim 13, wherein the plurality of telemetry schemes include different modes of transmitting AC or DC power and/or electrical signals.

21. The method of claim 13, wherein the plurality of telemetry schemes include different operational connections based on compatibility with other downhole measurement tools.

22. The method of claim 13, wherein the plurality of telemetry schemes include different operational connections based on tool bus type and connection between each downhole measurement tool.

23. A method for improving signal to noise ratio (SNR) in borehole telemetry, comprising:
transferring data over at least one datalink between a downhole telemetry module and a surface telemetry module, the datalink comprising a plurality of data telemetry schemes;
selecting one of the plurality of telemetry schemes based on at least one downhole parameter; and
transferring data over the datalink utilizing the selected telemetry scheme, wherein
the selected telemetry scheme reduces noise in the transferred data to increase the signal to noise ratio (SNR) of received data.

24. A borehole telemetry system, comprising:
a downhole telemetry module;
a surface telemetry module;
a datalink for transferring data between the downhole and surface modules, the datalink comprising a default telemetry scheme and an additional telemetry scheme; and
a switch mechanism configured for switching from the default telemetry scheme to the additional telemetry scheme based on measurement of a known test signal.

25. A borehole telemetry system of claim 24, wherein the measurement indicates that the default telemetry scheme cannot provide a desired signal-to-noise ratio.

26. A borehole telemetry system of claim 24, wherein the measurement indicates a failure of the default telemetry system.

* * * * *